US012305920B2

(12) United States Patent
Huang et al.

(10) Patent No.: US 12,305,920 B2
(45) **Date of Patent: *May 20, 2025**

(54) ALUMINUM ALLOY MATERIAL SMELTING DEVICE

(71) Applicant: CITIC Dicastal Co., Ltd., Qinhuangdao (CN)

(72) Inventors: Lixin Huang, Qinhuangdao (CN); Meng Li, Qinhuangdao (CN); Tieqiang Chen, Qinhuangdao (CN); Liguang Xie, Qinhuangdao (CN); Jinwei Liu, Qinhuangdao (CN); Xiusong Dong, Qinhuangdao (CN); Dan Yao, Qinhuangdao (CN)

(73) Assignee: CITIC Dicastal Co., Ltd., Qinhuangdao (CN)

(*) Notice: Subject to any disclaimer, the term of this patent is extended or adjusted under 35 U.S.C. 154(b) by 59 days.

This patent is subject to a terminal disclaimer.

(21) Appl. No.: 17/676,297

(22) Filed: Feb. 21, 2022

(65) Prior Publication Data

US 2023/0194171 A1 Jun. 22, 2023

(30) Foreign Application Priority Data

Dec. 20, 2021 (CN) ......................... 202123198393.6

(51) Int. Cl.

| | |
|---|---|
| ***F27B 3/18*** | (2006.01) |
| ***C22C 1/02*** | (2006.01) |
| ***F27D 27/00*** | (2010.01) |

(52) U.S. Cl.

CPC ................ *F27B 3/18* (2013.01); *C22C 1/026* (2013.01); *F27D 27/005* (2013.01)

(58) Field of Classification Search

CPC ......... C22C 1/026; C22C 1/1036; F27B 3/18; F27B 7/16; F27B 1/12; F27D 27/005; F27D 27/00; F27D 5/0068; F27D 2005/0081

(Continued)

(56) References Cited

U.S. PATENT DOCUMENTS 2,701,593 A * 2/1955 Dootson ............... A47J 19/023 99/506

4,598,899 A * 7/1986 Cooper ................... C22B 7/003 266/212

(Continued)

FOREIGN PATENT DOCUMENTS

KR 100697855 B1 * 3/2007

*Primary Examiner* — Keith D. Hendricks
*Assistant Examiner* — Moriah S. Smoot
(74) *Attorney, Agent, or Firm* — IPro, PLLC

(57) ABSTRACT

An aluminum alloy material smelting device comprises a furnace and a packing device with a packing basket, a stirring shaft connected with the packing basket and a stirring head connected with the bottom of the packing basket. The stirring head comprises a plurality of stirring blades with one end connected with the bottom of the packing basket and another end connected with each other on the central axis of the packing basket. The side wall of the packing basket is provided with a liquid passage hole to exchange liquid with the solution outside the packing basket. By rotating the stirring head, a solution vortex accelerating the diffusion of added elements can be formed only under the stirring head, which will not damage the covering film formed on the surface of aluminum alloy. Thus the scum on the surface is effectively prevented from being involved in the solution again.

5 Claims, 1 Drawing Sheet

(58) Field of Classification Search
USPC .......................................................... 266/235
See application file for complete search history.

(56) References Cited

U.S. PATENT DOCUMENTS 4,743,428 A * 5/1988 McRae ................. F27D 3/0026
420/513
4,946,647 A * 8/1990 Rohatgi .................. C22C 1/026
420/528
11,841,191 B2 * 12/2023 Huang ...................... C22C 1/03

* cited by examiner

ALUMINUM ALLOY MATERIAL SMELTING DEVICE

TECHNICAL FIELD

The disclosure herein relates to the technical field of alloy material smelting, in particular to an aluminum alloy material smelting device.

BACKGROUND

Magnesium-aluminum alloy is an aluminum alloy with magnesium as the main additive element, which has the advantages of high strength, low density and good heat dissipation, and is widely used in electronics, automobiles, aerospace and other fields. Pure aluminum has low density ($\rho$=2.7 g/cm$^3$), about ⅓ of the density of iron, low melting point (660° C.), and aluminum is face-centered cubic structure, so it has high plasticity ($\delta$: 32~40%, $\phi$: 70~90%), easy processing, and can be made into various profiles and plates, and has good corrosion resistance. However, the strength of pure aluminum is very low, and the value of Ob in annealed state is about 8 kgf/mm$^2$, so it is not suitable for structural materials. Through long-term production practice and scientific experiments, people gradually strengthen aluminum by adding alloying elements and heat treatment, etc., which leads to a series of aluminum alloys. The alloy formed by adding certain elements can keep the advantages of light weight of pure aluminum and also have high strength, and the $\sigma_b$ values can reach 24~60 kgf/mm$^2$ respectively. In this way, its "specific strength" (ratio of strength to specific gravity $\sigma_b/\rho$) is better than many alloy steels, and it has become an ideal structural material, which is widely used in machinery manufacturing, transportation machinery, power machinery and aviation industry, etc. The fuselage, skin and compressor of aircraft are often made of aluminum alloy to reduce their own weight. By using aluminum alloy instead of steel plate, the structural weight can be reduced by more than 50%.

Al—Mg alloys must be smelted under the protection of solvent. During the refining process of aluminum alloy, $Al_3O_3$ floats on the surface of aluminum alloy melt with bubbles, and the aluminum alloy melt covers the refining smelting agent having both protection and refining functions. Through adsorption, the oxidation inclusions in the melted aluminum alloy melt and the hydrogen adsorbed on them float up to the liquid level and enter the slag, so as to achieve the purpose of slag removal and degassing.

At present, there is great randomness in the research and development of new materials and the manufacturing and processing of materials. When making alloy materials, operators manually put in added elements and stir with stirring rods, resulting in low consistency of properties and chemical compositions of produced materials, uneven composition and low yield; and low efficiency and high labor intensity of workers.

SUMMARY

Aiming at the prior art, the present disclosure aims to provide an aluminum alloy material smelting device, which can accelerate diffusion and prevent aluminum alloy scum from being involved in solution again.

In order to achieve the above purpose, the present disclosure adopts the following technical solution:

An aluminum alloy material smelting device, comprising a furnace, a cutter packing device, the cutter-type packing device comprising a stirring shaft, a packing basket, a cutter-type stirring head, the stirring shaft connected with the packing basket, the bottom of the packing basket connected with a cutter-type stirring head, the cutter-type stirring head comprising a plurality of stirring blades, one end of the stirring blades connected with the bottom of the packing basket, the other end connected with each other on the central axis of the packing basket, and the side wall of the packing basket provided with a liquid passage hole to form liquid exchange with the solution outside the packing basket.

In some embodiments, the stirring blades are fan-shaped stirring blades with a central angle of 90 degrees.

In some embodiments, the fan-shaped stirring blades are four, each adjacent stirring blade being connected perpendicularly to one another.

In some embodiments, the cutter packing device further includes a partition plate separating the packing basket into a plurality of packing bins.

In some embodiments, the partition plates are uniformly arranged in four, dividing the packing basket into 4 packing bins.

In some embodiments, wherein the cutter-type packing device is made of iron and steel material.

Compared with the prior art, the present disclosure has the advantages that the rotation of the cutter-type stirring head forms a solution vortex to accelerate the diffusion of added elements, and the vortex is only formed under the stirring head, which will not damage the covering film formed on the surface of aluminum alloy, effectively prevent the scum on the surface from being involved in the solution again, thereby ensuring the consistency of the properties and chemical composition of the prepared aluminum alloy material, and reducing the influence of aluminum alloy scum on the solution.

In the picture: 1—furnace, 2—cutter-type packing device, 3—stirring shaft, 4—partition plate, 5—packing basket, 6—liquid passage hole, 7—cutter-type stirring head, 8—stirring blade, 9—packing bin.

DETAILED DESCRIPTION

It should be noted that the embodiments in the present disclosure and the features in the embodiments can be combined with each other without conflict.

A clear and complete description of the technical aspects of the present disclosure will be given below with reference to the accompanying drawings and in conjunction with embodiments which will be apparent to us that the described embodiments are only part of and not all of the embodiments of the present disclosure. Based on the embodiments in the present disclosure, all other embodiments obtained by those of ordinary skill in the art without making creative efforts are within the scope of protection of the present disclosure.

Figure 1:
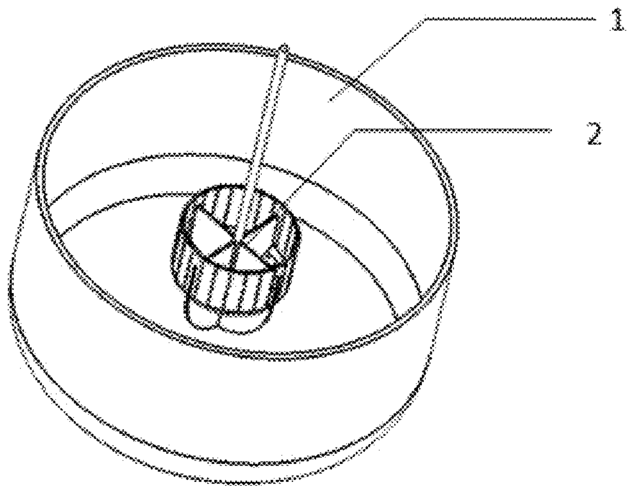
FIG. 1 is a structural schematic diagram of the aluminum alloy material smelting device of the present disclosure.
Figure 2:
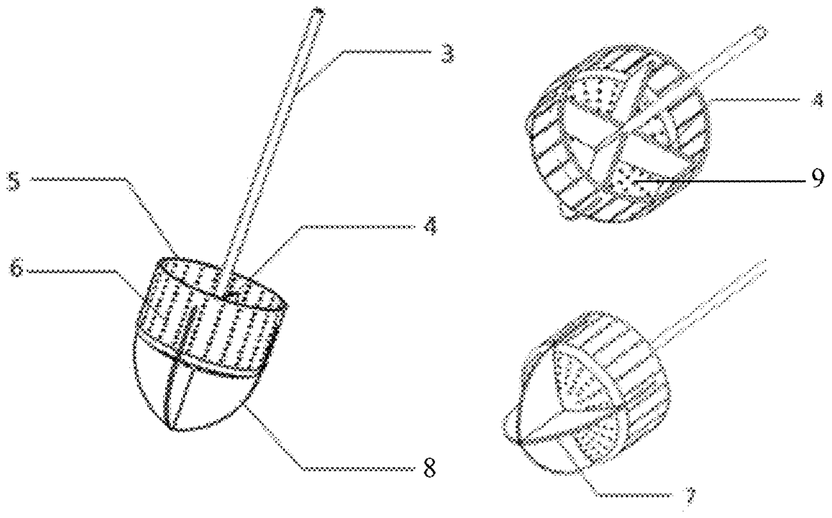
FIG. 2 is a structural schematic diagram of a cutter-type packing stirring device in an aluminum alloy material smelting device of the present disclosure.

As shown in FIGS. 1-2, a smelting device for alloy material comprises a smelting furnace 1 and a cutter-type packing device 2. The cutter-type packing device 2 comprises a stirring shaft 3, a packing basket 5, a cutter-type stirring head 7, a partition plate 4, a packing bin 9 and a liquid passage hole 6; the stirring shaft 3 is connected with the packing basket 5, and the bottom of the packing basket 5 is connected with a cutter-type stirring head 7. The cutter-type stirring head 7 comprises a plurality of fan-shaped stirring blades 8 with a central angle of 90 degrees. In this embodiment, there are four stirring blades 8, one side of the four stirring blades 8 is fixed at the bottom of the packing basket 5, and the other side is vertically connected with each other on the central axis of the packing basket 5 to form a cutter-type stirring head 7; the stirring shaft 3 extends the packing basket 5 and the cutter-type stirring head 7 into the smelting furnace 1 and enters the aluminum alloy melt. In order to ensure uniform diffusion in the stirring process, the packing basket 5 is preferably a cylinder, and of course it can also be of other structures that can meet the packing requirements; in order to uniformly place the master alloy, a plurality of partition plates 4 are arranged in the packing basket 5 according to the amount of metal blocks and master alloy to be added, and the partition plates 4 divide the packing basket 5 into a plurality of packing bins 9, so as to ensure the consistency of alloy melting and avoid the wear of stirring apparatus caused by the deviation of the master alloy to the same side due to centrifugation. In this embodiment, as a preferred option, the partition plates 4 are four, a partition plate 4 uniformly divides the packing basket 5 into four packing bins 9. The outer wall of the packing basket 5 and the bottom of the packing basket 5 are provided with a liquid passage hole 6, used for ensuring the flow exchange of solution inside and outside the packing basket 5. The aluminum alloy melt is injected into the packing bin 9 through the liquid passage hole 6 to dissolve the added master alloy. The cutter-type stirring head 7 rotates and stirs to form a vortex to accelerate the diffusion of the added element solution through the liquid passage hole 6. The flow direction of the aluminum liquid is parallel to the stirring shaft 3, and the aluminum liquid is pushed by the stirring blade 8. The cutter-type stirring head 7 can make the aluminum liquid flow downward, and then turn upward when encountering the bottom surface of the container to form an upper and lower circulating flow. In order to avoid the influence of long-term use of high temperature on the stirring head and the packing basket 5, both the stirring head and the packing basket 5 are made of iron and steel materials.

When the present disclosure is actually used, first, the metal block of the desired master alloy is uniformly added to the packing bin 9, the packing basket 5 is sunk into the aluminum solution along with the stirring head. The aluminum solution is submerged into the packing bin 9 through the upper surface of the packing basket 5 and injected into the packing bin 9 through the liquid passage hole 6 in the side wall and at the bottom of the packing basket 5. The added metal block is melted slowly, while the cutter-type stirring head rotates and stirs. The cutter-type stirring head 7 rotates and stirs to form a vortex to accelerate the diffusion of the added element solution through the liquid passage hole 6. Aluminum alloy solution easily reacts with oxygen and water vapor in the air to form a dense oxide film on the surface of molten aluminum during the melting process, so as to prevent further oxidation of molten aluminum. Due to the cutter head design, the stirring head moves axially and radially under the action of the impeller rotating at high speed. The bottom of the packing basket 5 acts as a baffle plate to prevent the liquid from moving axially upward. When the axial partial velocity makes the liquid flow downward along the axial direction, by the time it flows to the bottom of the furnace, it turns back to the rotary propeller along the furnace wall. When the radial partial velocity makes the liquid flow along the circumferential direction, it is divided into upward flow and downward flow by the time of encountering the furnace wall, and the radial downward part of the liquid meets the liquid generated by the axial return to the furnace wall to form turbulence. However, the radial upward part of the liquid moves upward along the furnace wall in a steady flow, which will not produce spinning phenomenon, so it will not destroy the dense oxide film formed on the surface, and will quickly drive the slag inclusion of molten aluminum to gather upward, so as to achieve rapid slag removal.

The vortex is only formed under the stirring head, and will not damage the covering film formed on the aluminum alloy surface, effectively preventing the scum on the surface from being involved in the solution again. The flow direction of the aluminum liquid is parallel to the stirring shaft 3, the aluminum liquid is pushed by the stirring blade 8, and the cutter-type stirring head 7 can make the aluminum liquid flow downward, and then turn upward when encountering the bottom surface of the container to form an upper and lower circulating flow. Due to its own rotation, mechanical energy is transferred to liquid, resulting in forced convection of liquid in the furnace, therefore the master alloy in the packing bin 9 is subjected to centrifugal force, to fully mix the melted liquid droplets with the aluminum solution diffusing outward through the liquid passage hole 6. Meanwhile the liquid flow formed by the rotation of the stirring head will quickly circulate the mixed solution in the packing basket 5 and its vicinity until it is dispersed to other positions, resulting in the formation of alloy concentration gradient in the vicinity of the packing basket 5, which in turn promotes the faster melting of the master alloy block in the packing basket 5 to form the concentration balance of the mixed solution. At the same time, the flow velocity of the mixed liquid thrown out by the packing basket 5 is different from that driven by the stirring head, so that the liquid at the junction of the two is strongly shearing. In addition, the aluminum solution on the top of the packing basket 5 quickly replenishes the gap left by the mixed solution passing through the liquid hole 6 by centrifugation, and continues to scour the master alloy until all the master alloy blocks in the packing bin 9 are melted to the aluminum solution and diffused uniformly.

Compared with the prior art, the present disclosure has the advantages that the rotation of the cutter-type stirring head 7 forms a solution vortex to accelerate the diffusion of added elements, and the vortex is only formed under the stirring head, which will not damage the covering film formed on the surface of aluminum alloy, effectively prevent the scum on the surface from being involved in the solution again, thereby ensuring the consistency of the properties and chemical composition of the prepared aluminum alloy material, and reducing the influence of aluminum alloy scum on the solution.

Although embodiments of the disclosure have been shown and described, it will be understood to those of ordinary skill in the art that various variations, changes, substitutions and modifications may be made to these embodiments without departing from the principle and spirit of the disclosure, the scope of which is defined by the appended claims and their equivalents.

What is claimed is:

1. An aluminum alloy material smelting device, comprising a furnace and a packing device, wherein the packing device comprises a stirring shaft, a packing basket and a stirring head, wherein the packing basket has a bottom, the stirring shaft is connected with the packing basket, the stirring head is connected with the bottom of the packing basket, and is located outside and below the packing basket, the stirring head comprising a plurality of stirring blades each having a first end and a second end, the first ends of the stirring blades are connected with the bottom of the packing basket, the second ends of the stirring blades are connected with each other on the central axis of the packing basket, and the side wall of the packing basket is provided with a liquid through hole to form liquid exchange with a liquid solution outside the packing basket, and the bottom of the packing basket acts as a baffle plate to prevent the liquid below the bottom of the packing basket from moving axially upward.

2. An aluminum alloy material smelting device according to claim 1, wherein each of the plurality of the stirring blades has a shape of a sector with a central angle of 90 degrees.

3. An aluminum alloy material smelting device according to claim 2, wherein the number of the plurality of stirring blades is four, and adjacent stirring blades are vertically connected with each other.

4. An aluminum alloy material smelting device according to claim 1, wherein the packing device further comprises a plurality of partition plates dividing the packing basket into a plurality of packing bins.

5. An aluminum alloy material smelting device according to claim 4, wherein four partition plates are uniformly arranged, and the packing basket is divided into four packing bins.

* * * * *